United States Patent
Reis

(10) Patent No.: US 11,595,815 B2
(45) Date of Patent: Feb. 28, 2023

(54) USING SATELLITE DIVERSITY FOR ENHANCING COMMUNICATION CONFIDENTIALITY

(71) Applicant: Higher Ground LLC, Palo Alto, CA (US)

(72) Inventor: Robert S. Reis, Palo Alto, CA (US)

(73) Assignee: Higher Ground LLC, Palo Alto, CA (US)

( * ) Notice: Subject to any disclaimer, the term of this patent is extended or adjusted under 35 U.S.C. 154(b) by 321 days.

(21) Appl. No.: 16/794,777

(22) Filed: Feb. 19, 2020

(65) Prior Publication Data

US 2021/0258775 A1 Aug. 19, 2021

(51) Int. Cl.
| | |
|---|---|
| H04B 7/185 | (2006.01) |
| H04W 12/037 | (2021.01) |
| H04L 9/40 | (2022.01) |
| H04B 7/024 | (2017.01) |
| G01S 19/42 | (2010.01) |

(52) U.S. Cl.
CPC .......... *H04W 12/037* (2021.01); *H04B 7/024* (2013.01); *H04B 7/18513* (2013.01); *H04L 63/20* (2013.01); *G01S 19/42* (2013.01)

(58) Field of Classification Search
CPC .. H04W 12/037; H04W 12/033; H04B 7/024; H04B 7/18513; H04B 7/02; H04L 63/20; H04L 63/18; G01S 19/42
See application file for complete search history.

(56) References Cited

U.S. PATENT DOCUMENTS

| | | | | |
|---|---|---|---|---|
| 6,804,251 | B1 * | 10/2004 | Limb | H04W 28/16 370/473 |
| 2005/0195107 | A1 * | 9/2005 | Wakamatsu | G01S 19/28 342/357.67 |
| 2015/0372997 | A1 * | 12/2015 | Lokamathe | H04L 63/0428 713/171 |

* cited by examiner

*Primary Examiner* — Minh Trang T Nguyen
(74) *Attorney, Agent, or Firm* — Behmke Innovation Group LLC; James M. Behmke; Jonathon P. Western

(57) ABSTRACT

According to one or more of the embodiments herein, systems and techniques for using satellite diversity for enhancing communication confidentiality are provided. In particular, a system in accordance with the techniques herein enhances the security of encrypted messages transmitted over a secure channel, specifically through the use of satellite communications diversity to securely deliver secret messages from a sender to a recipient, ensuring message confidentiality. That is, the techniques herein provide secure message communication over satellites, particularly with additional message security in the presence of an eavesdropping adversary party by segmenting the message and sending the various message segments over different diverse paths.

20 Claims, 12 Drawing Sheets

USING SATELLITE DIVERSITY FOR ENHANCING COMMUNICATION CONFIDENTIALITY

TECHNICAL FIELD

The present disclosure relates generally to securing wireless communication systems, and, more particularly, to using satellite diversity for enhancing communication confidentiality.

BACKGROUND

When a secure message needs to be conveyed over a communication medium, a plaintext message may be encrypted using an encryption algorithm. For example, the algorithm may use a cipher key or an encryption key to encrypt the plaintext and generate an encrypted message that can be deciphered (or decrypted) by the intended recipient, while being otherwise not readable by unintended recipients. The encrypted text is also known as "ciphertext" (or "cyphertext").

It is in principle possible to decrypt ciphertext without possessing the decryption key, but, for a well-designed encryption scheme, considerable computational resources and skills are required. An authorized recipient, on the other hand, can easily decrypt the message with a key provided by (or exchanged with) the originator to recipients, but which is not provided to unauthorized users.

Adversaries who may attempt to gain access to the plaintext of a confidential communication need to first gain access to the ciphertext message and then use their computers to break the encryption code. To this end, adversaries eavesdrop on communication networks with the goal of intercepting confidential communications.

Satellites are a technology commonly used to communicate information, particularly from areas that are otherwise not accessible via other communication means. However, satellites are not safe from eavesdropping, either. More specifically, adversaries may position a spy satellite next to a communication satellite and attempt to monitor communication traffic via a communication channel. Similarly, in other scenarios, adversaries may fly an airplane or a drone in the transmission path between a user terminal (UT) and the associated communication satellite, with the goal of eavesdropping on the communication and intercepting the transmitted ciphertext data in transit.

SUMMARY

According to one or more of the embodiments herein, systems and techniques for using satellite diversity for enhancing communication confidentiality are provided. In particular, a system in accordance with the techniques herein enhances the security of encrypted messages transmitted over a secure channel, specifically through the use of satellite communications diversity to securely deliver secret messages from a sender to a recipient, ensuring message confidentiality. That is, the techniques herein provide secure message communication over satellites, particularly with additional message security in the presence of an eavesdropping adversary party by segmenting the message and sending the various message segments over different diverse paths.

In one specific embodiment, a method comprises: determining, by a communication device, a plurality of available satellites for communication from the communication device; determining, by the communication device, degrees of diversity among the plurality of available satellites; selecting, by the communication device, at least a first satellite and second satellite of the plurality of available satellites based on the degrees of diversity such that the first satellite and second satellite are sufficiently diverse; determining, by the communication device, a message segmentation policy for a particular message; segmenting, by the communication device, the particular message into one or more first segments and one or more second segments based on the segmentation policy; and communicating, by the communication device, the one or more first segments of the particular message to the first satellite and the one or more second segments of the particular message to the second satellite.

Other embodiments of the present disclosure may be discussed in the detailed description below, and the summary above is not meant to be limiting to the scope of the invention herein.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

As noted above, plaintext messages may be encrypted into ciphertext for added privacy of the communication, but it is still possible for eavesdroppers to decrypt ciphertext without the appropriate decryption key through access to the ciphertext and advanced computational decryption resources.

As also mentioned above, satellite communications are not immune from eavesdropping, where spy satellites, airplanes, or drones may monitor for intercepted communication traffic in the transmission path between a user terminal (UT) and the associated communication satellite.

One avenue for ensuring that the confidentiality of the transmitted data is not compromised is to use more sophisticated encryption algorithms. This approach has its limitations and drawbacks. On the one hand it increases the computation requirements on the equipment that is used for communication, making it especially challenging for mobile devices. On the other hand, adversaries who gain access to messages may use their large computational power to decipher the confidential message and gain access to the plaintext. Of special concern is the progress in quantum computing which greatly increases the risk that adversaries will be able to decipher ciphertext messages they are able to intercept in transit.

The techniques herein, therefore, increase the security of confidential messages which may be intercepted in transit. According to one or more of the embodiments herein, that is, a system of satellite diversity may be used for enhancing communication confidentiality to enhance the security of encrypted messages transmitted over a secure channel. As described in greater detail below, satellite communications diversity securely delivers secret messages from a sender to a recipient, specifically ensuring message confidentiality by segmenting the message and sending the various message segments over different diverse paths, thus thwarting the efforts of eavesdropping adversary parties.

Figure 1:
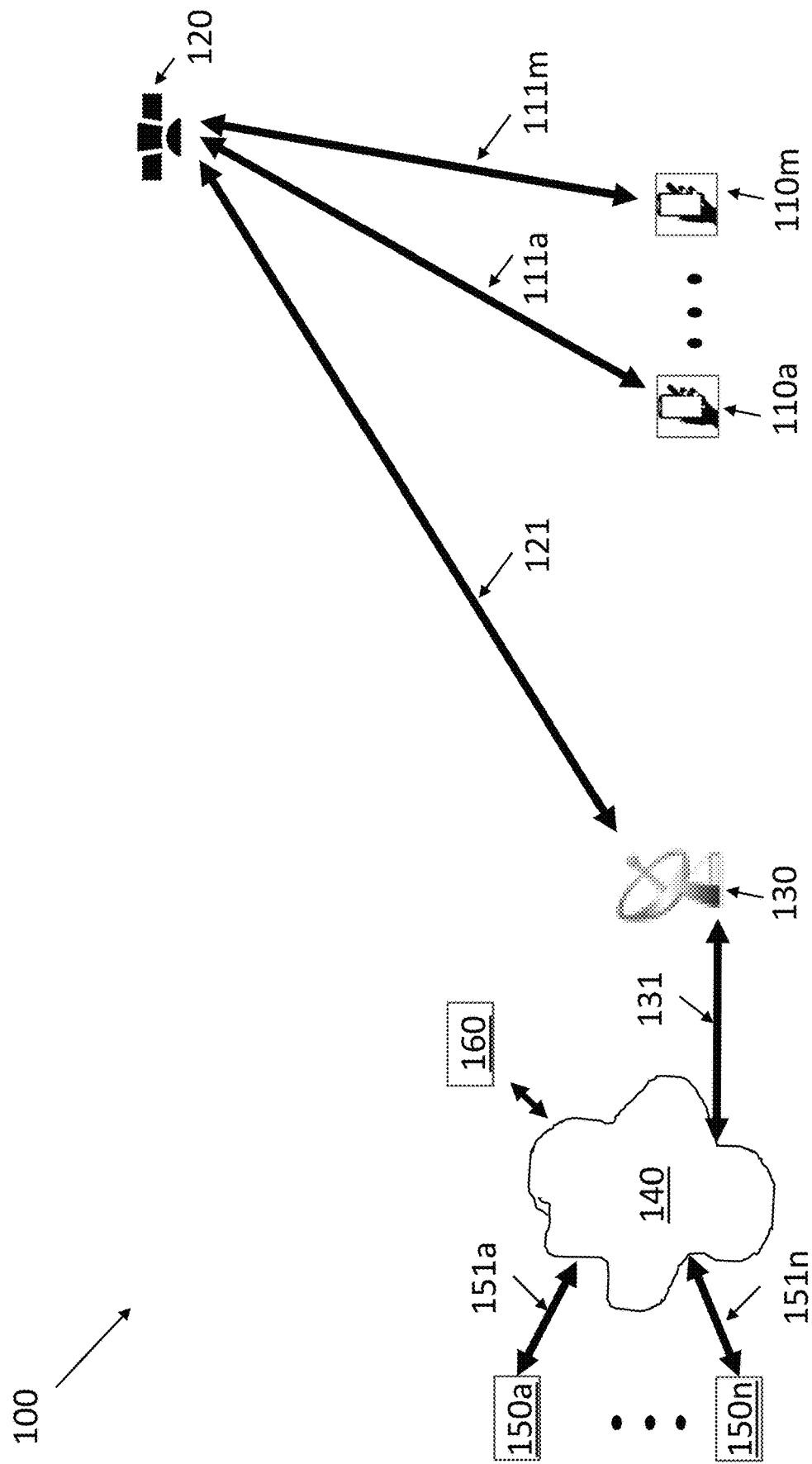
FIG. 1 illustrates an example satellite communication system.

FIG. 1 illustrates an example communication system 100 that provides communication infrastructure for users 110a through 110m and users 150a through 150n via satellite communication channels 111a through 111m and communication channels 151a through 151n. Specifically, communication from devices 110 is illustratively communicated to satellite 120 which in turn communicates with ground station 130 via communication link 121.

Ground station 130 is connected via link 131 to communication network 140. In some embodiments, communication network 140 is a private secure network. In other embodiments, communication network 140 is a public network, such as the Internet. In accordance with yet another embodiment, the network 140 may be a hybrid of the public Internet and a private enterprise networks. In accordance with yet another embodiment the network 140 may be a wireless, a PSTN, a voice over IP (VoIP) network or a hybrid of these networks.

Users 150a through 150n are illustratively connected to the network 140 via links 151a through 151n. The connectivity network, which includes the communication links and channels described above, facilitates communication (e.g., voice, video, text, etc.) between any collection of users 110a through 110m and users 150a through 150n.

Security of confidential messages may be achieved by end-to-end encryption performed by any pair of end devices engaged in communication, encryption over any communication link segment used, encryption over any collection of segments used, and any combination of the above. In some specific embodiments, an encryption server 160 may be used to terminate encryption and to re-encrypt the message for consumption by other users.

Figure 2A:
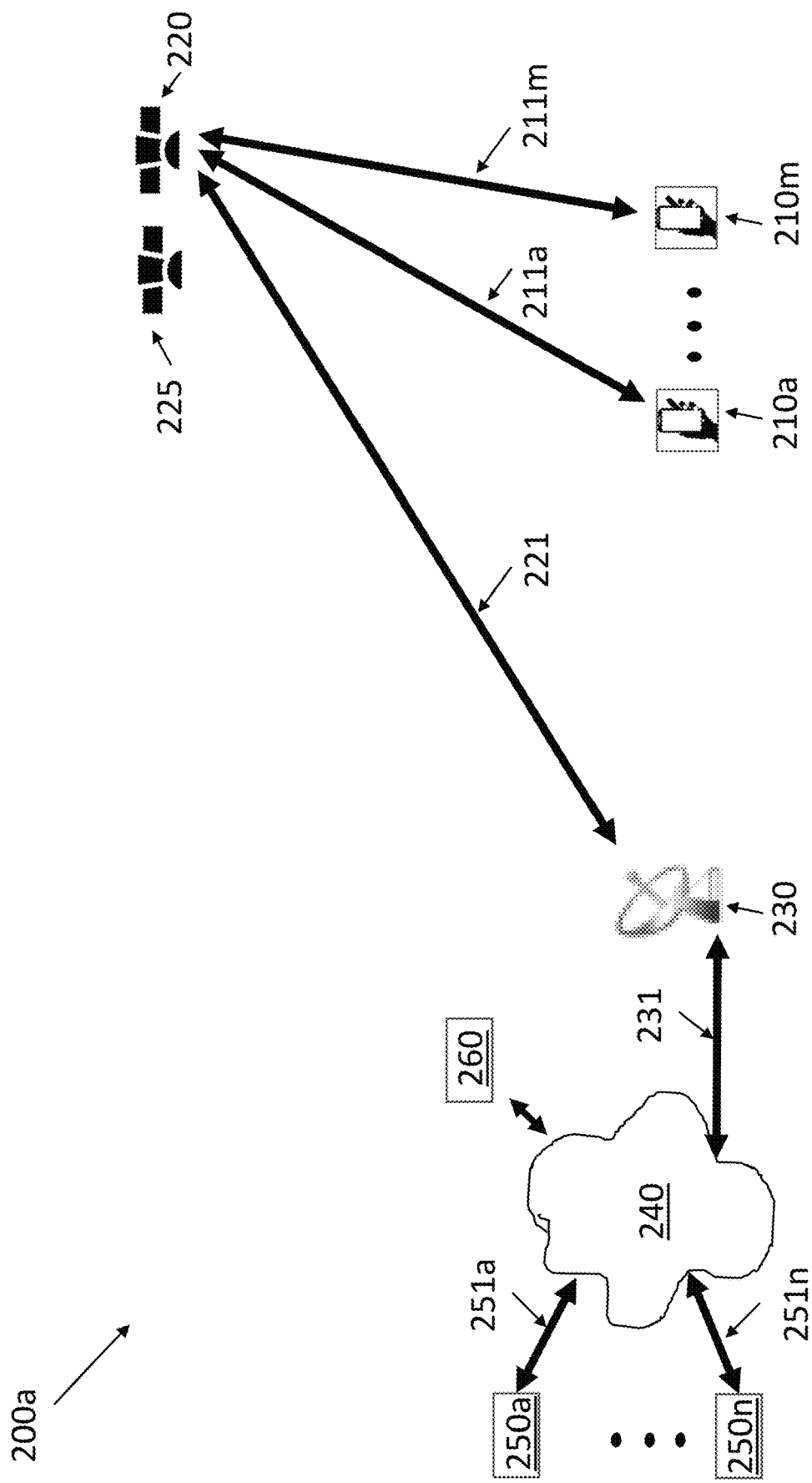
FIG. 2A illustrates an example satellite communication system in the presence of adversary eavesdropping satellite.

FIG. 2A illustrates an example communication system 200a in the presence of an adversary eavesdropping satellite 225. Users 210a through 210m are similar to users 110a through 110m; users 250a through users 250n are similar to users 150a through users 150n. Communication satellite 220, ground station 230, and network 240 along with communication links 211a through 211m, 221, 231, and 251a through 251n provide communication links for the communication infrastructure. Encryption server 260 performs the same function as server 160 of FIG. 1.

Assume in FIG. 2A that an adversary satellite 225 is placed in the vicinity of communication satellite 220 with the goal of eavesdropping on the communication that satellite 225 facilitates. Thus, any transmission between users 210a through users 210m and the communication satellite 220 over links 211a through 211m may be captured by spy satellite 225. Similarly, any communication between communication satellite 220 and ground station over link 221 may be captured by spy satellite 225. Though the communication over links 211a through 211m as well as communication over link 221 may be, and usually is encrypted, the ability of a spy satellite to capture this communication/data in flight may compromise the confidentiality of this communication.

Figure 2B:
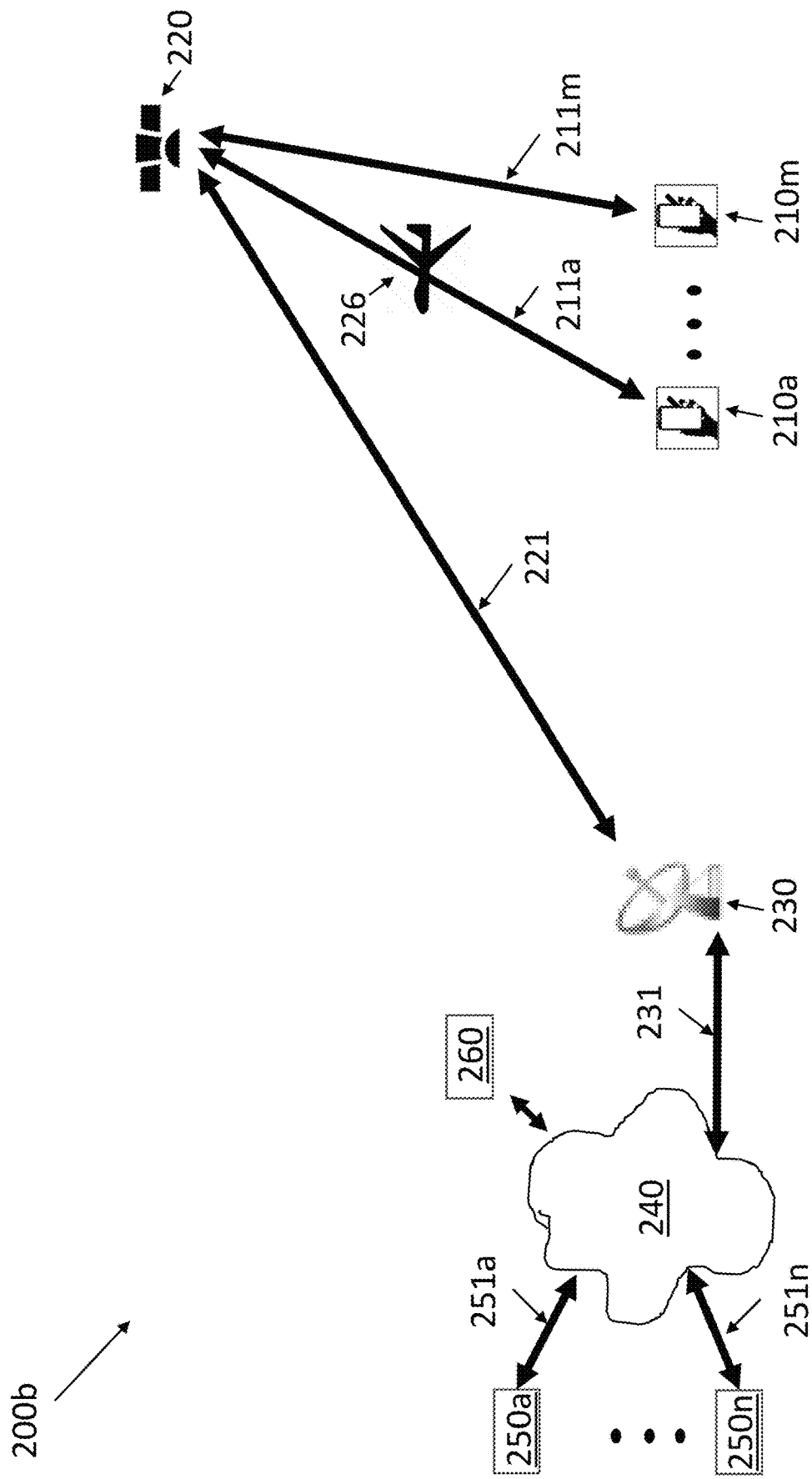
FIG. 2B illustrates an example satellite communication system in the presence of an adversary eavesdropping aircraft.

FIG. 2B, on the other hand, illustrates an example communication system 200b similar to FIG. 2A in which the eavesdropping on the satellite communication is performed by aircraft 226. Unlike the spy satellite that is able to intercept and listen to all of the communications over satellite 220, the aircraft 226 usually is deployed over a smaller area of interest, e.g., a battlefield, and as such it is able to intercept communication only between a limited number of users such as communication of user 150a.

Figure 3:
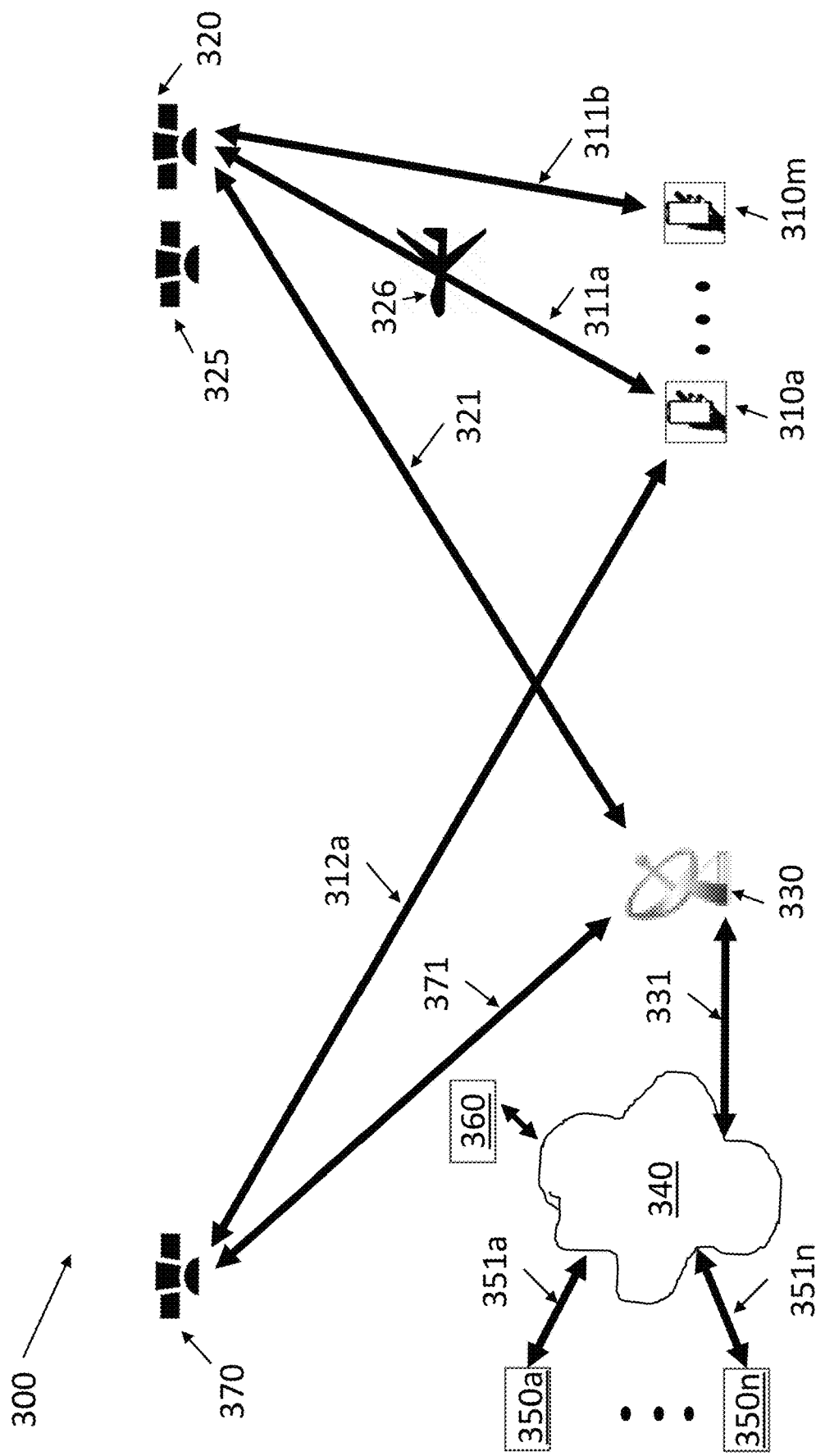
FIG. 3 illustrates an example satellite diversity communication system in accordance with one or more embodiments of the present disclosure.

FIG. 3 illustrates an example communication device 300 in accordance with one or more embodiments herein that greatly enhances the security of communication of users 310a through 310m. Users 310a through 310m are similar to users 110a through 110m of FIG. 1; users 350a through users 350n are similar to users 150a through users 150n of FIG. 1. Communication satellite 320, ground station 330, and network 340 along with communication links 311a through 311m, 321, 331, and 351a through 351n provide communication links for the communication infrastructure. Encryption server 360 performs the same function as server 160 of FIG. 1.

Communication satellite 370 is capable of supporting communications with user 310a over links 312a. Satellite 370 may, and often does, use ground station 330 over communication link 371. In accordance with another preferred embodiment, satellite 370 may use a different ground station (not shown) via a different ground station to satellite link (not shown). To simplify the explanation, FIG. 3 shows that only user 310a can communicate via either satellite 320 or 370. Those skilled in the art should recognize that any subset of users 310a through 310m should be able to use either one of the satellites (or both) to communicate with other users.

To secure the communication links, plaintext messages are commonly encrypted using state of the art encryption algorithms. The resulting ciphertext conceals the original plaintext allowing only an authorized person, who has the cipher key, to decrypt the ciphertext back into the original plaintext. One of the properties of a good encryption algorithm is that when a single bit in the plaintext is changed, it changes a very large number of bits in the ciphertext. To decrypt the ciphertext, the algorithm (or the equipment using the decryption algorithm) must have access to the decryption key and to the entire ciphertext message. Missing even one bit from the ciphertext would prevent even a person who has the decryption key from deciphering the ciphertext into plaintext. Similarly, a person with powerful computers would not be able to decrypt the ciphertext.

As explained above, an adversary who gains access to the ciphertext by eavesdropping on a communication channel may attempt to break the encryption code using brute force of large computing power, e.g., a large number of computers in a data center, quantum computing, etc. However even this method requires access to the entire ciphertext message.

Returning to FIG. 3, in accordance with one or more embodiments of the present invention, when a communication device such as user equipment 310a through 310m needs to send ciphertext over satellite links, it divides the ciphertext into k segments where k is a number greater than 1. In certain embodiments, the number k may be selected based on the number of satellites that the communication equipment elects to use for a given communication session. This number may be governed by the number of satellites visible to the communication equipment. In accordance with a specific embodiment, the stricter the confidential classification of the message the larger number of communication satellites that the device elects to use.

Figure 4A:
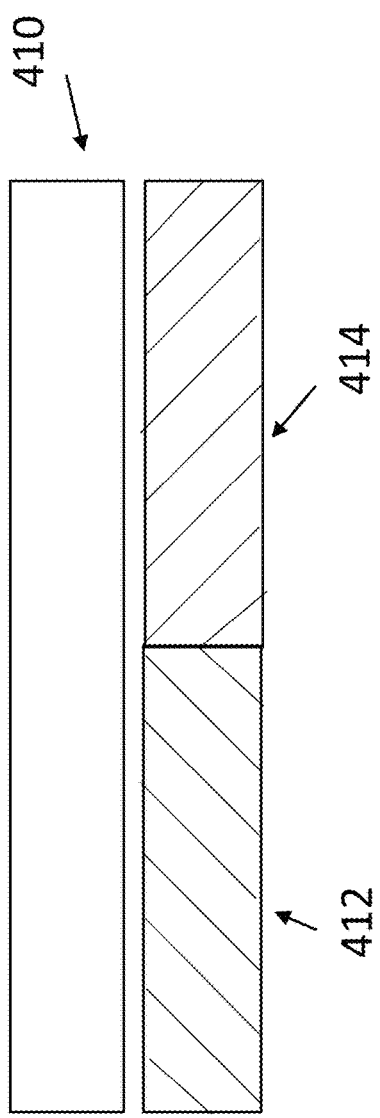
FIGS. 4A-4B illustrate examples of various ways that a ciphertext message may be segmented in accordance with one or more embodiments of the present disclosure.
Figure 4B:
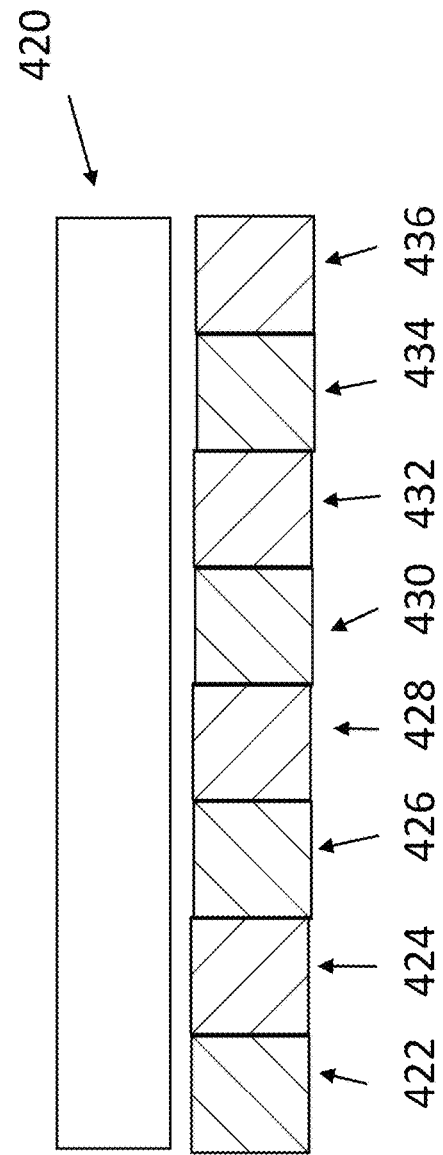

FIGS. 4A and 4B provide illustrations of various ways that the ciphertext may be, and often is, segmented. Both illustrations use an example number k=2.

FIG. 4A, in particular, is an illustration 400a of a ciphertext message 410 that a device (such as devices 310a through 310m) needs to send over a satellite link to another user (such as users 310a through 310m) or to another user (such as users 350a through 350n).

In accordance with a first embodiment herein, the sending device segments the message 410 into k=2 segments (412 and 414). The first message segment (e.g., 412) is sent towards satellite 320. This segment may be intercepted by the eavesdropping spy satellite 325 or by the eavesdropping spy aircraft 326. The second message segment (e.g., 414) is sent towards a second communication satellite 370 which is assumed to be in a different angle in the sky (and perhaps using a different communication frequency) than the first communication satellite. Since the location of the spy satellite as well as the location of the spy aircraft is not known, the device preferably selects two communication satellites that are as far away from each other as possible (different angles in the sky towards the two satellites).

The transmission towards the two different satellites can be done sequentially, first transmitting the first segment towards the first satellite and then redirecting the antenna of the device towards the second satellite and transmitting the second segment. Alternatively, the device may use two (k=2) different antennas and transmit the two messages simultaneously towards the two (k) satellites.

FIG. 4B provides an illustrative example 400b of a different segmentation of the ciphertext message 420. In accordance with a second example embodiment, the original message 420 is segmented into message segments 422, 424, 426, 428, 430, 432, 434, and 436. Those skilled in the art would recognize that each one of the segments includes a message header containing the message ID, the method used for creating the segmentation, and any other data that is needed to reassemble the ciphertext.

In one embodiment, the message is segmented as soon as the whole message is ready for transmission. That is, the transmission process may occur after message 420 is ready, after dividing the message into the segments, and proceeding with transmission of the segments (e.g., sequentially), for example:

segment 422 to satellite 320,
segment 424 to satellite 370,
segment 426 to satellite 320,
segment 428 to satellite 370,
segment 430 to satellite 320,
segment 432 to satellite 370,
segment 434 to satellite 320, and
segment 436 to satellite 370.

In an alternate embodiment, the message 420 may be, and often is, segmented in real time as it is being generated. For example, the transmission process of message 420 may proceed with transmission of the following pairs of segments as they become ready: {422, 424}, {426, 428}, {430, 432}, and {434, 436}; namely where the first segment of each pair (e.g., 422 in the first segment pair) is sent toward the first satellite 320 and the second segment of the pair (e.g., 424, respectively) is sent toward the second satellite 370, repeating for each segment pair as they become available (e.g., alternating segments between the first and second satellites).

Furthermore, in an alternate non-real-time implementation (that is, after the message 420 is completely ready to send), all of the message segments that are going to be transmitted towards first satellite 320 are grouped together into a single message including segments {422, 426, 430, 434} and similarly, the message segments towards the second satellite 370, namely {424, 428, 432, 436}, are grouped together as well. Each message contains a header which includes information detailing the specific method used for the message segmentation, the message ID, and any other information required for reassembling the ciphertext. Cipher segment set {422, 426, 430, 434} including the associated header is sent towards first satellite 320 and ciphertext set {424, 428, 432, 436} including the associated header is sent towards the second satellite 370.

It should be mentioned that the division and transmission of segments shown above are merely example embodiments, and are not meant to be limiting to the scope of the present disclosure. In particular, segments may be divided in different orders, different proportions, and so on, referred to herein as "segmentation configurations". For example, in a two-satellite diversity scheme, the segments may alternatively be transmitted in a "first satellite, first satellite, second satellite" manner (e.g., "1, 1, 2, 1, 1, 2 . . . ", two messages sent to the first satellite for every one sent to the second satellite), or many other alternative arrangements. Also, as will be appreciated, where greater numbers of satellites are used, greater options of diverse communication become available, e.g., "1, 2, 3, 4, 1, 2, 3, 4 . . . " (where "1-4" indicate four diversely available satellites), or "1, 1, 2, 2, 3, 3, 4, 4, 1, 1, 2, 2, 3, 3, 4, 4 . . . ", or "1, 2, 1, 3, 2, 3, 4, 1, 4, 2, 3, 2 . . . " and so on, where greater complexities may offer greater protection against sophisticated eavesdropping attempts. Also, many variations of segment groupings may be sent as well, such as grouping and sending fewer segments rather than all segments destined for a particular satellite, unequal numbers of segments or groups, and so on.

Figure 5:
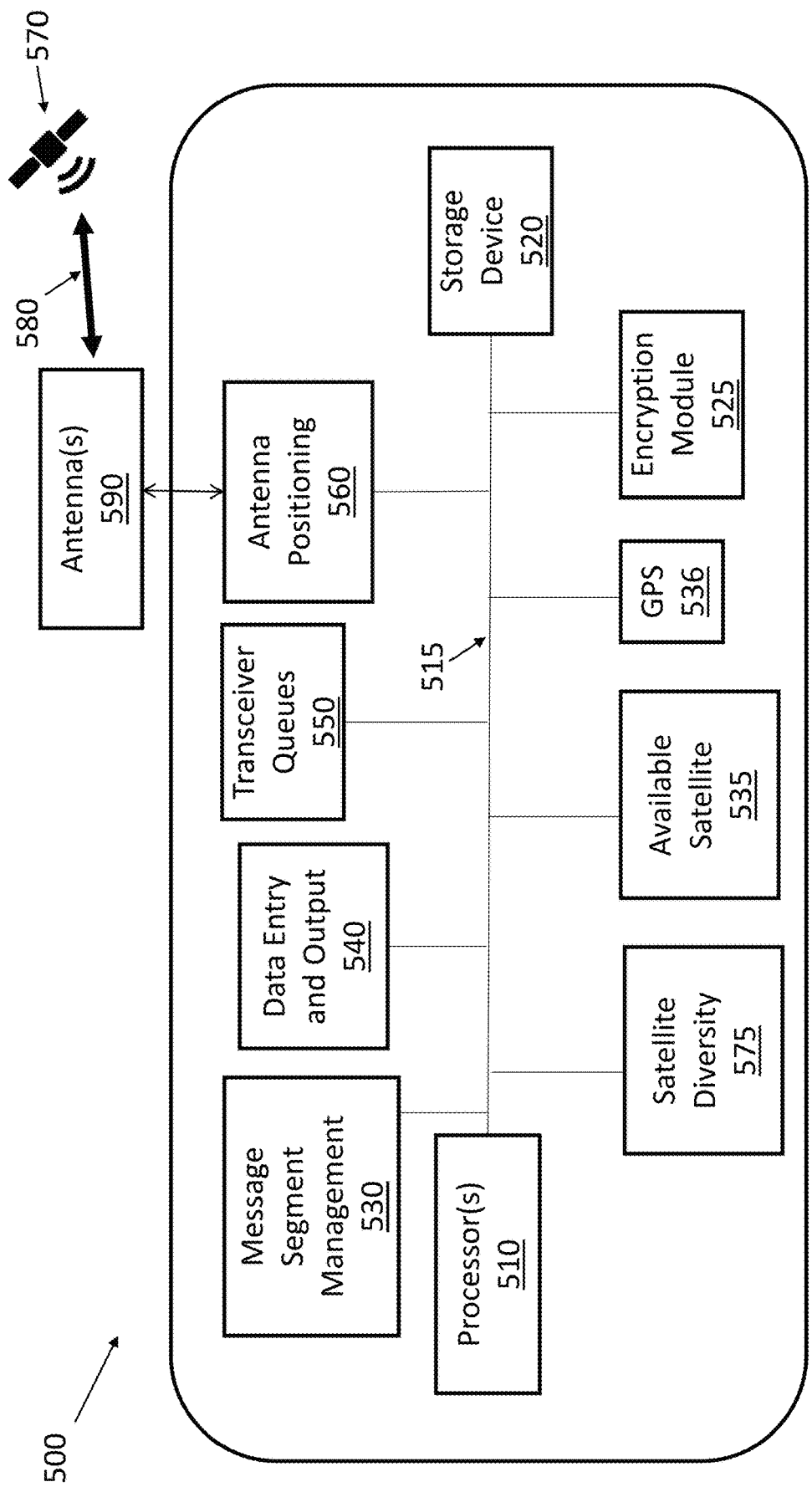
FIG. 5 illustrates an example communication device in accordance with one or more embodiments of the present disclosure.

FIG. 5 is an example drawing of a communication device 500 in accordance with one or more embodiments herein. The operation of device 500 is governed by the controller or processor(s) 510.

Device 500 may include message data entry module 540. The module may be any combination of a microphone for entering a voice message, a keyboard for entering a text message, or a video camera for entering a video message. In accordance with another embodiment, the data entry module is a sensor such as an IoT device which produces data to be transmitted securely to another user such as a person, a server, or another device. The data may move under the control of processor 510 which controls the operations of the device 500. The control may be, and often is, governed by software modules residing in the memory of storage device 520. All of the communication between the various modules is conducted over an internal communication bus 515. In accordance with a preferred embodiment, the data is encrypted using encryption module 525. The encryption of the data is optional and in accordance with another embodiment, the system skips the encryption process.

The ciphertext of the encrypted message (or the plaintext message) is illustratively segmented by the message segment management module 530. Depending on the specific segmentation method configured in the device, or determined by the message segmentation management, the segments of the message to be sent to a specific satellite may be constructed and optionally stored in transceiver queue 550. Headers may be added to each message segment to facilitate reconstruction of the original ciphertext (or plaintext).

GPS module 536 may be used to determine the location of the device which is used in module 535 to determine which satellites are visible to the device. Specifically, the available satellite module determines, based on the GPS location of the device, which satellites are visible from the location of the device. Satellite diversity module 575 determines the number of visible satellites and their angles in the sky in reference to the device. The module then determines whether the available satellites provide proper satellite diversity, e.g., whether there are at least two available satellites that provide sufficient angular separation with reference to the device 500. The specific number of satellites may, and often does, help determine the segmentation policy which is governed by the message segmentation manager module 530, as described above.

The antenna positioning module 560 illustratively positions the antenna in the direction of the first satellite and then upon completion of sending the first message segment towards the first satellite, directs the antenna towards the second satellite. The operation of directing the antenna towards the second satellite can be one of physically moving the antenna 590 towards the selected satellite, instructing the user of the device 500 to point the antenna towards the satellite, or changing the parameters of a phased array antenna to point the lobe of the antenna towards the selected satellite, or any other method resulting in pointing the antenna towards the selected satellite.

Those skilled in the art would recognize that that the same process may be used when there are more than two satellites towards which the message segments need to be sent. As discussed below in greater detail, the same method may also be used when the device 500 receives messages from another user.

Satellite 570 is similar to satellites 320 and 370 of FIG. 3. As discussed above, at times more than two satellites are used to further diversify the directions in which a message is transmitted.

For reception, the device 500 may probe any satellite periodically to find out if there are any messages for the device. If there is a message for the device, the ground station (via the probed satellite) transmits a command to the device advising it about the segments that will be sent to it and the satellites that will be used. The device verifies that it can communicate with the satellites and acknowledges to the ground station the proposed transmission scheme. Alternatively, the device may suggest to the ground station which satellites are visible and request that the ground station utilize these satellites for sending the message.

After receiving the message segments via satellite 570 and the antenna 590, the message segments may be queued in the transceiver queue 560. When all of the segments from the first satellite are received, antenna positioning redirects the antenna towards a second satellite (not shown), and receives the other message segments from the second satellite. (Alternatively, in certain embodiments as mentioned above, the antenna positioning redirects the antenna toward the appropriate satellite as necessary, such as where the reception occurs in real-time in an alternating manner between satellites.) Message segment management 530 assembles the plurality of the received segments into the complete ciphered message (410 or 420). The assembled ciphertext is deciphered by the encryption module 530 and presented to the user via the data entry and output module 540. The outputted data is one or more of a text message, a voice message, and/or a video content. In accordance with a specific embodiment, the data is a command to a machine or an autonomous device.

Figure 6A:
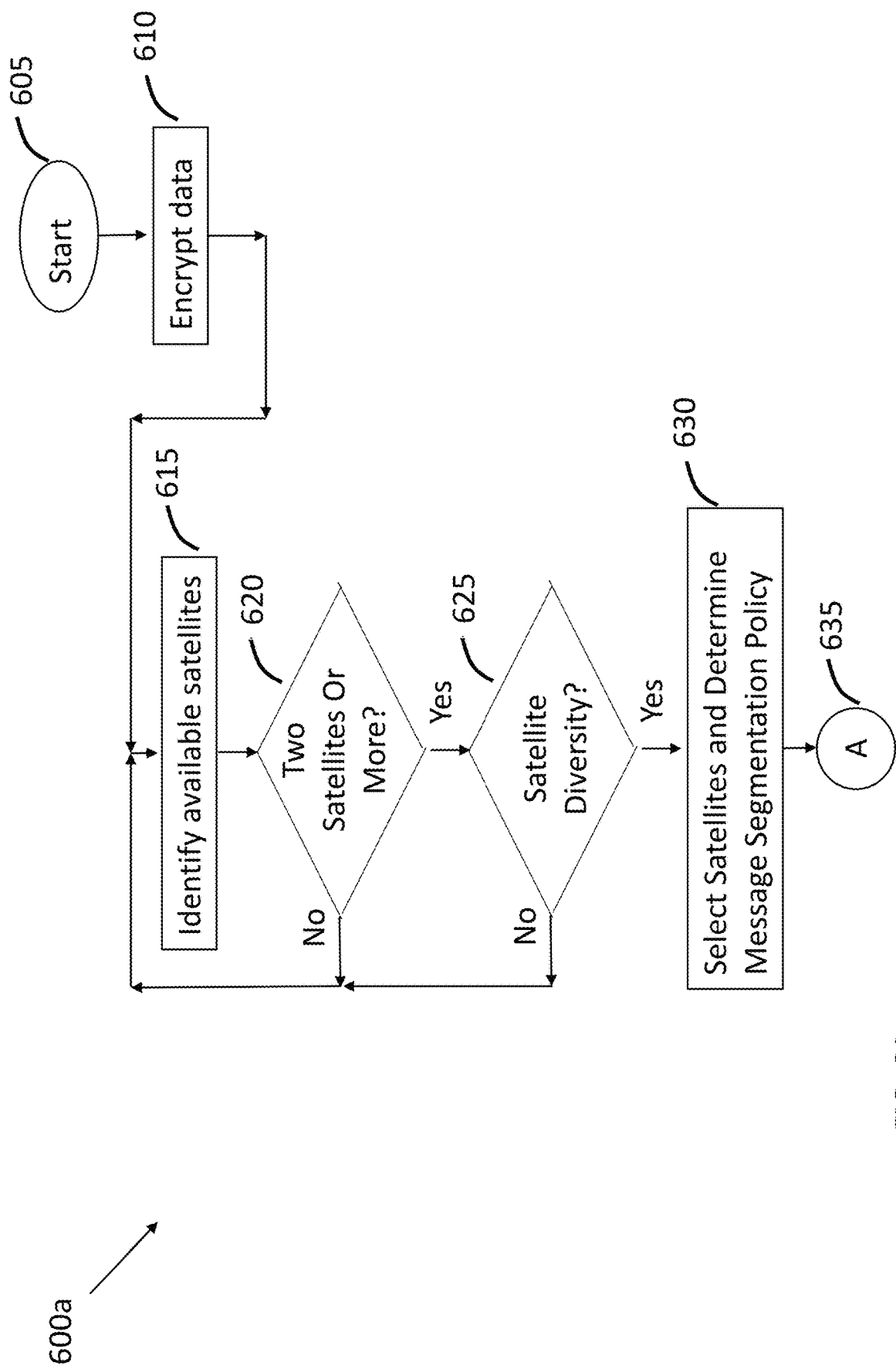
FIGS. 6A-6C illustrate a simplified example procedure for data transmission in accordance with one or more embodiments of the present disclosure.
Figure 6B:
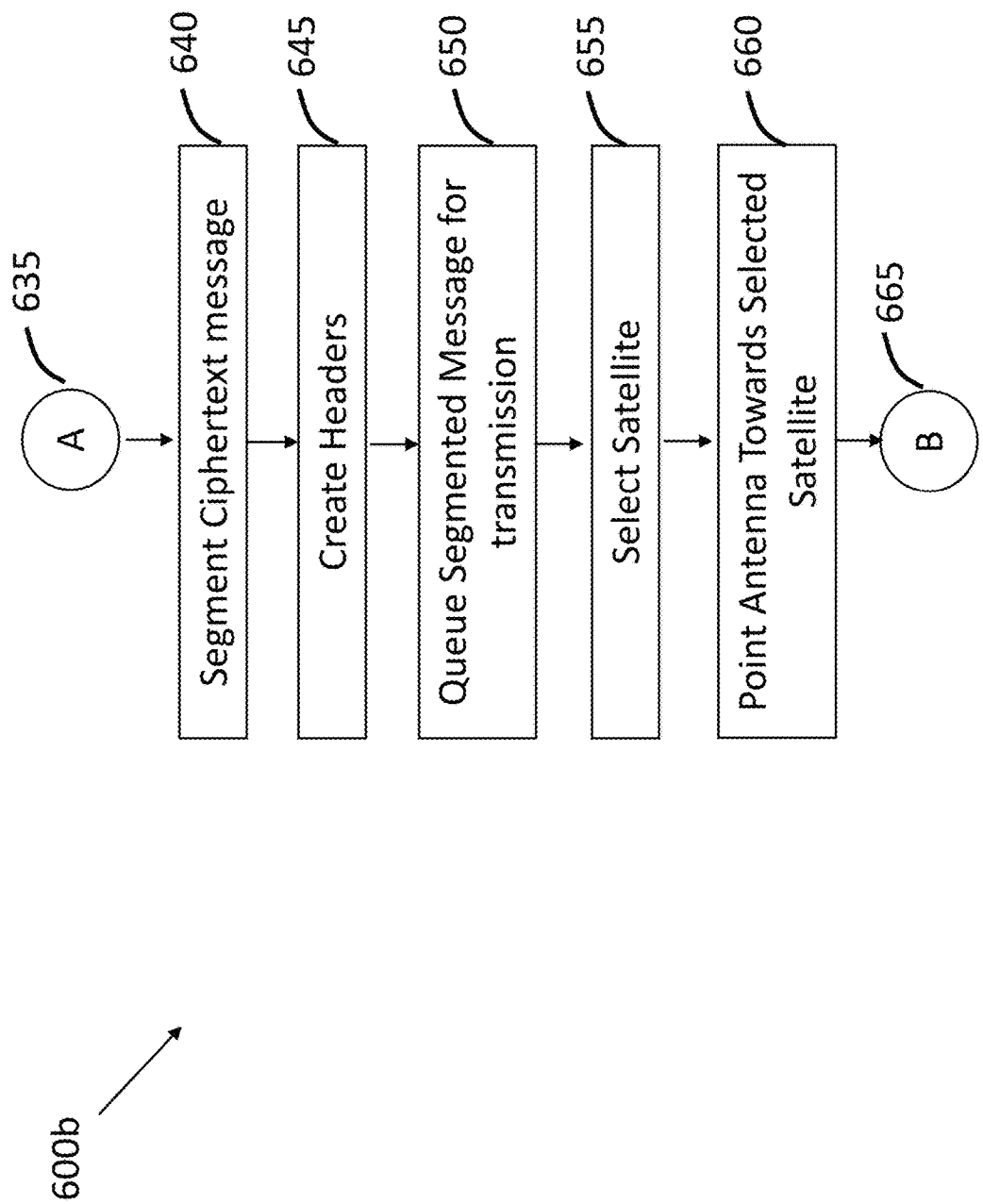
Figure 6C:
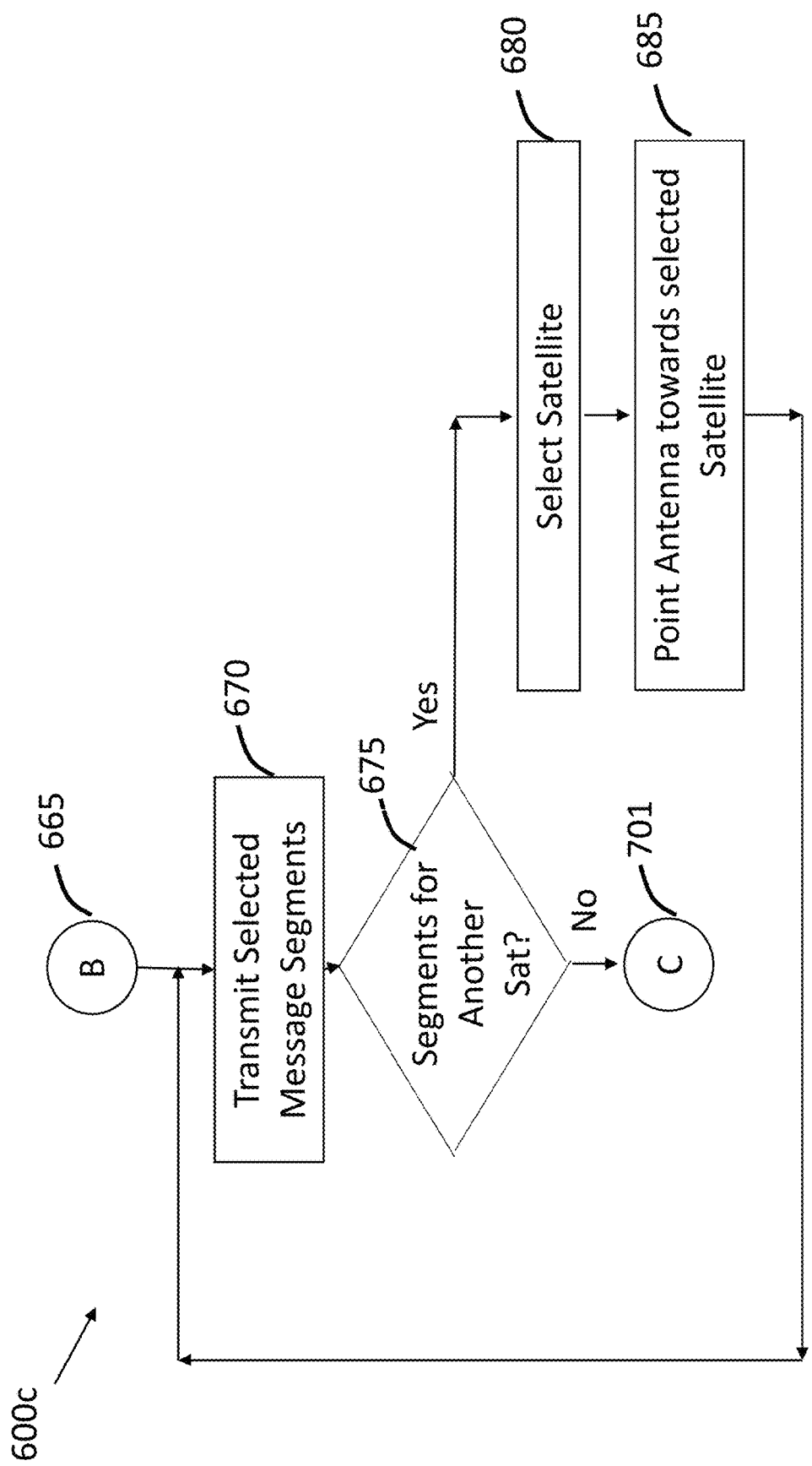

FIGS. 6A, 6B, and 6C provide example flow charts 600a, 600b, and 600c, respectively, of a process of transmitting data by a device such as device 500. The process starts at operation 605 where data is entered into a transmitting device such as device 500.

The method proceeds to step 610 where the data is encrypted. Then, in step 615, based on the GPS location of the device, the method determines which satellites are visible by the device and can be utilized. The method proceeds to step 620, where a determination is made whether the device can communicate using more than one satellite. If in step 620 the method determines that only one satellite is available, satellite diversity cannot be achieved and therefore the operation loops back to step 615 where the device continues to search for other available satellites. At times the device needs to be moved to another location from which two or more satellites are visible and can be used. However if operations in step 620 determine that two or more satellites are visible, the method proceeds to step 625 where the method examines the angular diversity of the two or more satellites. If the step determines that a sufficient degree of satellite diversity can be achieved, e.g., the angle between the lines of view towards the two satellites is greater than the angle of the lobe of the device antenna, the method proceeds to step 630. (Alternatively, the degree of diversity among available satellites may be based on communication parameters such as diversity of frequency, channel, band, etc.) However if step 625 determines that the available satellites do not provide sufficient satellite diversity, the process loops back to step 615 where the device continues to search for another satellite that can provide the required angular diversity.

In step 630 the device selects the satellites it will use from the available satellites and determines the segmentation policy based on the number of selected satellites. The process continues via a connector step "A" 635 to step 640 where the ciphertext is segmented based on the policy determined in step 630. The method continues to step 645 where appropriate headers are created and augmented to the message segments. The method continues to step 650 where the ciphertext segments and their associated headers are queued for transmission. The process proceeds to step 655 where the first satellite is selected, and in step 660 the antenna of the device is pointed towards the selected satellite.

The method proceeds via connector step "B" 665 to step 670. In step 670 the method transmits the queued segments intended to be sent via the first satellite. The method proceeds to step 675 where the step determines if the queues contain message segments to be sent via another satellite. If there are other message segments, the method proceeds to step 680 where the other satellite is selected. The method proceeds to step 685 where the antenna is pointed towards the selected satellite. The method loops back to step 670 where the segments intended to be sent via the said satellite are transmitted. The method continues to loop until all of the message segments are sent via the intended satellites.

When all of the message segment queues are empty, or when otherwise all of the message segments have been sent, the method continues from step 675 to connection step "C"

701 where the method proceeds to step 725 (in FIG. 7A) where the device queries the ground station whether it has any messages for it.

Although the operations of the device are described with reference to communication with satellite 570, those skilled in the art would recognize that the same teachings apply to communication with any airborne device such as a communication airplane, a drone, or a manned or autonomous vehicle (AV).

Figure 7A:
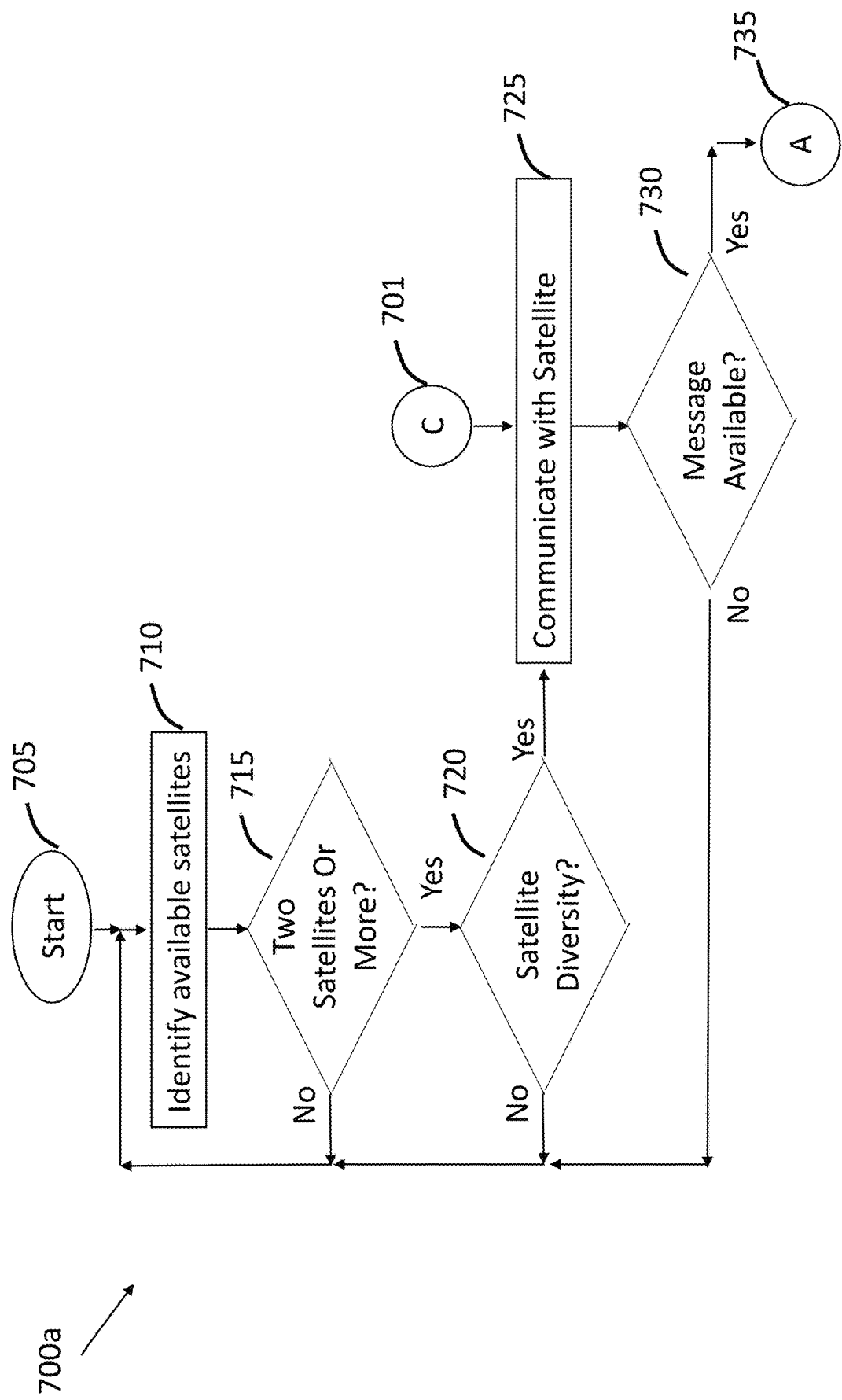
FIGS. 7A-7C illustrate a simplified example procedure for receiving data in accordance with one or more embodiments of the present disclosure.
Figure 7B:
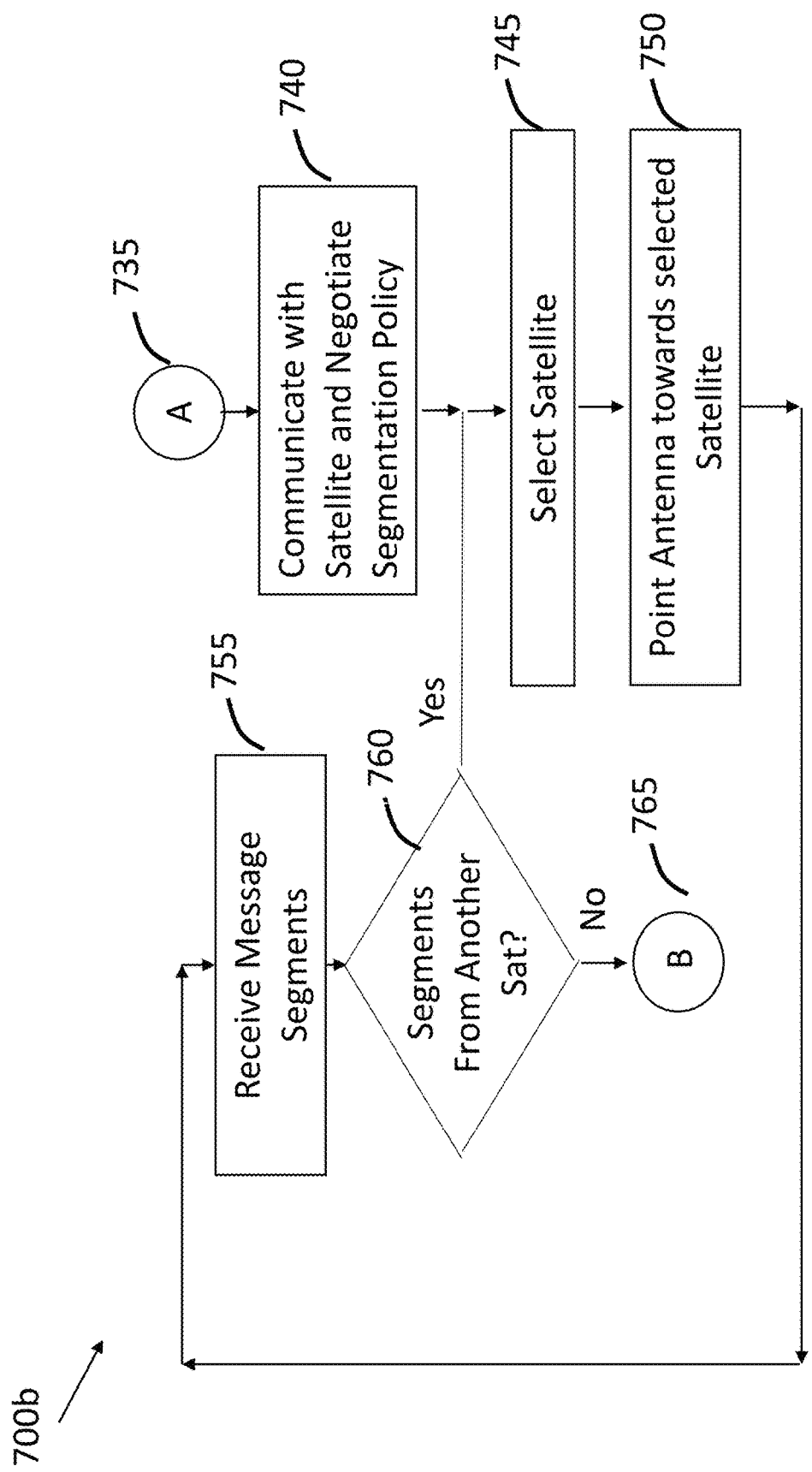
Figure 7C:
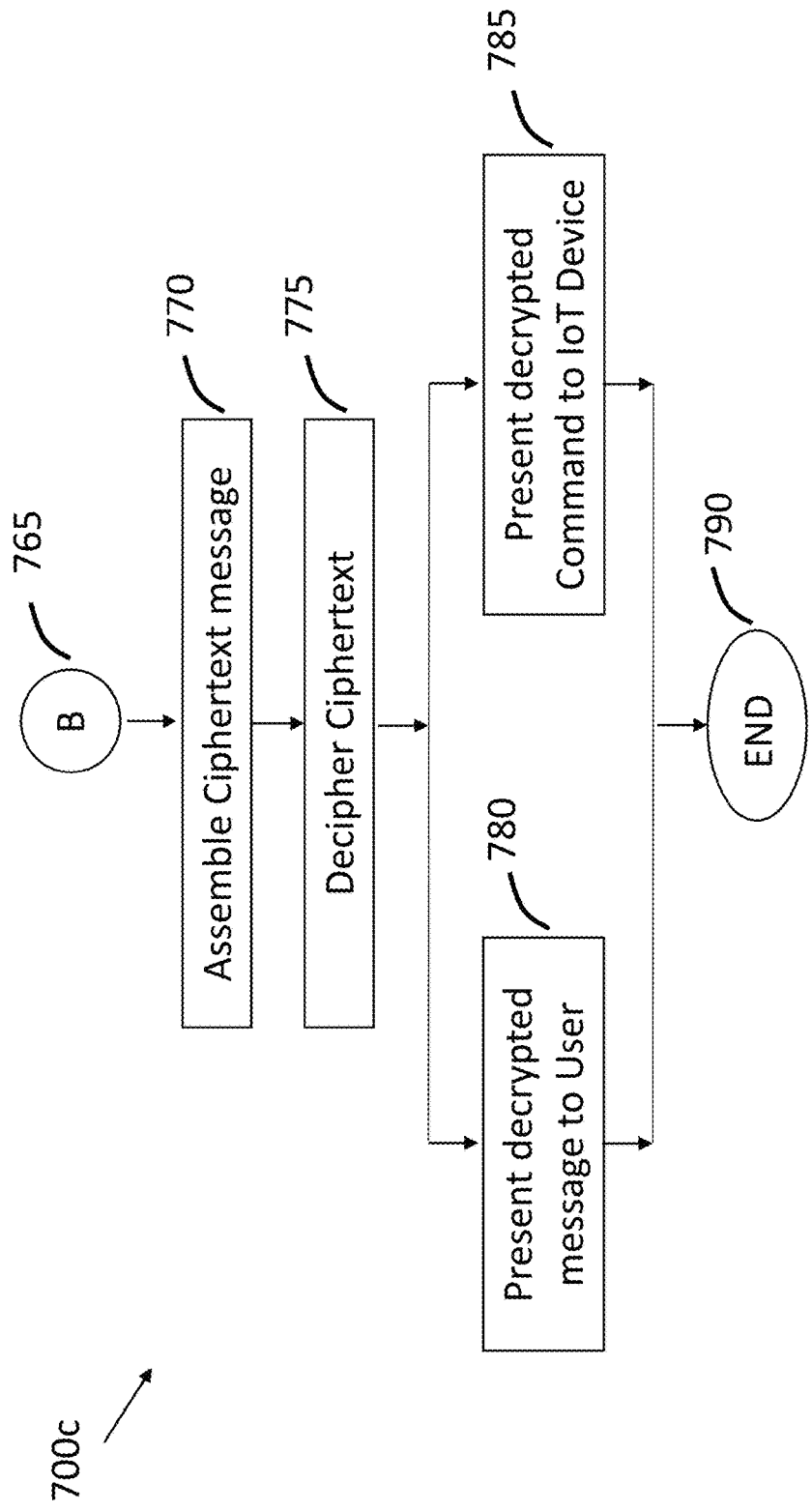

FIGS. 7A, 7B, and 7C provide example flow charts 700a, 700b, and 700c, respectively, of receiving data. The method starts at step 705 and proceeds to step 710 where the method determines which communication satellites are available. The method then proceeds to 715 where the operation determines if two or more satellites are available for the device. If the operation determines that there are less than two satellites, the method loops back to step 710 where the device continues to search for at least one more satellite.

However if the operation in step 715 determines that two or more satellites are available, the method proceeds to step 720 to check the angular diversity of the satellites. If the operation determines that the identified satellites provide proper satellite diversity, i.e., the angle between the lines of sight towards the two satellites is e.g., greater than the angle of the lobe of the device's antenna, the process continues to step 725. Otherwise, the method loops back to step 710 where the device continues to search for another satellite that would provide proper angular diversity.

Returning to step 725, the device communicates with one of the identified satellites and queries the ground station whether it has a message for it. As mentioned above, the operation of querying the ground station whether it has a message for the device may, and often is, performed after the device sends a message to the ground station via a satellite.

The operation proceeds to step 730 where the method determines if there is a message that the ground station needs to send to it. If the ground station does not have a message for the device, the method loops back to step 710 where the process of probing the ground station for a message continues. In accordance with a specific embodiment, the probing takes place periodically or whenever it is triggered by the operator of the device.

However if step 730 determines that the ground station has a message for the device, the method proceeds via connector step "A" 735 to step 740 where the device in communication with the ground station negotiates the segmentation policy, including the satellites that will be used for the communication. As part of the negotiation, the device forwards to the ground station the satellites which are available to it. In accordance with another embodiment, the device forwards to the ground station its GPS location and the ground station uses this information to determine which satellites are available for the device.

The method proceeds to step 745 where one of the agreed upon satellites is selected. The method proceeds to step 750 where the antenna of the device is pointed towards the selected satellite. The method proceeds to step 755 wherein segments of the message, which are sent by the ground station via the selected satellite, are received by the device. The segments are stored in the device, e.g., in transceiver queues 550 of device 500.

The method proceeds to step 760 wherein the method determines (based on the segmentation policy which was obtained from or negotiated with the ground station) whether there are additional message segments that need to be received via another satellite. If the method determines that there are additional message segments, the method loops via steps 745, 750, and 755, selects the next satellite from the segmentation policy, points the antenna of the device to the selected satellite, and receives additional message segments from the ground station via the newly selected satellite.

However if at step 760 the operation determines that all of the message segments have been received, the method proceeds via connector step "B" 765 to step 770 where all of the message segments are used to assemble the message. The method proceeds to step 775 where the received ciphertext is deciphered, producing the clear-text original message. If the sent message was not encrypted, step 775 is skipped. The process proceeds to either step 780 or step 785. For the embodiment that a user is the intended recipient of the received message, in step 780 the message is presented to a user. The presentation can be performed by any combination of presenting a text message, playing a voice message, presenting a video, or presenting information on a gage. Alternatively, if the intended recipient is a machine or an IoT device, the deciphered message is presented to the device.

The illustrative process ends at step 790.

It should be noted that while certain steps within the flowcharts may be optional and the steps shown in FIGS. 6A-7C are merely examples for illustration, and certain other steps may be included or excluded as desired. Furthermore, while a particular order of the steps is shown, this ordering is merely illustrative, and any suitable arrangement of the steps may be utilized without departing from the scope of the embodiments herein. Moreover, the methods are described separately, certain steps from each procedure may be incorporated into one or more of the other methods, and the various steps are not meant to be mutually exclusive.

In closing, according to one or more illustrative embodiments of the present disclosure, the techniques herein may be directed to a system and method (and corresponding software processes, e.g., a tangible, non-transitory, computer-readable medium storing program instructions that cause a computer on a communication device to execute a particular process) for using satellite diversity for enhancing communication confidentiality specifically comprising: determining, by a communication device, a plurality of available satellites for communication from the communication device; determining, by the communication device, degrees of diversity among the plurality of available satellites; selecting, by the communication device, at least a first satellite and second satellite of the plurality of available satellites based on the degrees of diversity such that the first satellite and second satellite are sufficiently diverse; determining, by the communication device, a message segmentation policy for a particular message; segmenting, by the communication device, the particular message into one or more first segments and one or more second segments based on the segmentation policy; and communicating, by the communication device, the one or more first segments of the particular message to the first satellite and the one or more second segments of the particular message to the second satellite.

In one embodiment, selecting the first satellite and second satellite is based on a diversity between the first satellite and second satellite being greater than any other diversities between the plurality of satellites.

In one embodiment, determining the plurality of available satellites is based on a global positioning satellite (GPS) location of the communication device and known locations of the plurality of satellites being visible in the sky above the communication device according to the GPS location.

In one embodiment, degrees of diversity among the plurality of available satellites is based on angular diversity between the plurality of available satellites. In one embodiment, the techniques further determine angular diversity of the plurality of available satellites based on a difference in an angle between a line of sight between the communication device for the plurality of available satellites. In still another embodiment, the first satellite and second satellite are sufficiently diverse when the angle between the line of sight towards the first and second satellites is greater than an angle of a lobe of a satellite antenna of the communication device antenna.

In one embodiment, degrees of diversity among the plurality of available satellites is based on communication parameters of the plurality of available satellites selected from a group consisting of: frequency; channel; and band.

In one embodiment, the message segmentation policy defines one or more of: a number of segments to which the particular message should be segmented; a size of each segment; a segmentation configuration; a number of satellites that should be used for the particular message; and an association between segments and specific satellites that should be used for each segment.

In one embodiment, the techniques further comprise attaching a header to each of the one or more first segments of the particular message and the one or more second segments of the particular message, the message header to facilitate reassembling of the one or more first segments and the one or more second segments into the particular message by a corresponding receiver.

In one embodiment, the techniques further comprise determining a number of satellites to select from the plurality of available satellites based on a number of satellites of the plurality of available satellites with a degree of diversity from each other greater than a predetermined threshold.

In one embodiment, the techniques further comprise determining a number of satellites to select from the plurality of available satellites based on a level of confidentiality of the particular message, wherein higher levels of confidentiality result in a higher number of selected satellites than lower levels of confidentiality.

In one embodiment, the techniques further comprise: selecting a third satellite such that the third satellite is sufficiently diverse from one or both of the first satellite and second satellite; segmenting the particular message into one or more third segments in addition to the one or more first segments and one or more second segments based on the segmentation policy; and communicating the one or more third segments of the particular message to the third satellite.

In one embodiment, the techniques further comprise preventing communicating of the particular message in response to there being no set of satellites of the plurality of available satellites with a sufficient degree of diversity.

In one embodiment, the techniques further comprise: placing the one or more first message segments in a first transceiver queue of the communication device; placing the one or more second message segments in a second transceiver queue of the communication device; communicating the one or more first segments from the first transceiver queue when a satellite antenna of the communication device is pointing at the first satellite; and communicating the one or more second segments from the second transceiver queue when the satellite antenna of the communication device is pointing at the second satellite.

In addition, according to one or more illustrative embodiments of the present disclosure, the techniques herein may be directed to an apparatus (e.g., communication device) designed for using satellite diversity for enhancing communication confidentiality specifically comprising: a processor configured to execute one or more processes; a communication interface configured to communicate via one or more satellite antennas associated with the apparatus; and a memory configured to store a process executable by the processor, the process, when executed, configured to: determine a plurality of available satellites for communication from the communication device; determine degrees of diversity among the plurality of available satellites; select at least a first satellite and second satellite of the plurality of available satellites based on the degrees of diversity such that the first satellite and second satellite are sufficiently diverse; determine a message segmentation policy for a particular message; segment the particular message into one or more first segments and one or more second segments based on the segmentation policy; and communicate the one or more first segments of the particular message to the first satellite and the one or more second segments of the particular message to the second satellite.

While there have been shown and described illustrative embodiments that relate to satellite diversity for enhancing communication confidentiality, it is to be understood that various other adaptations and modifications may be made within the scope of the embodiments herein. For example, the embodiments may, in fact, be used in a variety of types of wireless communication networks and/or protocols, and need not be limited to the illustrative satellite network implementation. Furthermore, while the embodiments may have been demonstrated with respect to certain communication environments, physical environments, or device form factors, other configurations may be conceived by those skilled in the art that would remain within the contemplated subject matter of the description above.

Furthermore, in the detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

In particular, the foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   determining, by a communication device, a plurality of available satellites for communication from the communication device;
   determining, by the communication device, degrees of angular diversity among the plurality of available satellites;

selecting, by the communication device, at least a first satellite and second satellite of the plurality of available satellites based on the degrees of angular diversity such that the first satellite and second satellite are sufficiently angularly diverse;

determining, by the communication device, a message segmentation policy for a particular message;

segmenting, by the communication device, the particular message into one or more first segments and one or more second segments based on the segmentation policy; and communicating, by the communication device, the one or more first segments of the particular message to the first satellite and the one or more second segments of the particular message to the second satellite.

2. The method as in claim 1, wherein selecting the first satellite and second satellite is based on a diversity between the first satellite and second satellite being greater than any other diversities between the plurality of satellites.

3. The method as in claim 1, wherein determining the plurality of available satellites is based on a global positioning satellite (GPS) location of the communication device and known locations of the plurality of satellites being visible in the sky above the communication device according to the GPS location.

4. The method as in claim 1, wherein the method further comprises:
determining the angular diversity of the plurality of available satellites based on a difference in an angle between a line of sight between the communication device for the plurality of available satellites.

5. The method as in claim 4, wherein the first satellite and second satellite are sufficiently diverse when the angle between the line of sight towards the first and second satellites is greater than an angle of a lobe of a satellite antenna of the communication device.

6. The method as in claim 1, wherein degrees of diversity among the plurality of available satellites is based on communication parameters of the plurality of available satellites selected from a group consisting of: frequency; channel; and band.

7. The method as in claim 1, wherein the message segmentation policy defines one or more of: a number of segments to which the particular message should be segmented; a size of each segment; a segmentation configuration; a number of satellites that should be used for the particular message; and an association between segments and specific satellites that should be used for each segment.

8. The method as in claim 1, further comprising:
attaching a header to each of the one or more first segments of the particular message and the one or more second segments of the particular message, the message header to facilitate reassembling of the one or more first segments and the one or more second segments into the particular message by a corresponding receiver.

9. The method as in claim 1, further comprising:
determining a number of satellites to select from the plurality of available satellites based on a number of satellites of the plurality of available satellites with a degree of diversity from each other greater than a predetermined threshold.

10. The method as in claim 1, further comprising:
determining a number of satellites to select from the plurality of available satellites based on a level of confidentiality of the particular message, wherein higher levels of confidentiality result in a higher number of selected satellites than lower levels of confidentiality.

11. The method as in claim 1, further comprising:
selecting a third satellite such that the third satellite is sufficiently diverse from one or both of the first satellite and second satellite;

segmenting the particular message into one or more third segments in addition to the one or more first segments and one or more second segments based on the segmentation policy; and communicating the one or more third segments of the particular message to the third satellite.

12. The method as in claim 1, further comprising:
preventing communicating of the particular message in response to there being no set of satellites of the plurality of available satellites with a sufficient degree of diversity.

13. The method as in claim 1, further comprising:
placing the one or more first message segments in a first transceiver queue of the communication device;

placing the one or more second message segments in a second transceiver queue of the communication device;

communicating the one or more first segments from the first transceiver queue when a satellite antenna of the communication device is pointing at the first satellite; and communicating the one or more second segments from the second transceiver queue when the satellite antenna of the communication device is pointing at the second satellite.

14. A tangible, non-transitory, computer-readable medium storing program instructions that cause a computer on a communication device to execute a process comprising:
determining a plurality of available satellites for communication from the communication device;

determining degrees of angular diversity among the plurality of available satellites;

selecting at least a first satellite and second satellite of the plurality of available satellites based on the degrees of angular diversity such that the first satellite and second satellite are sufficiently angularly diverse;

determining a message segmentation policy for a particular message;

segmenting the particular message into one or more first segments and one or more second segments based on the segmentation policy; and communicating the one or more first segments of the particular message to the first satellite and the one or more second segments of the particular message to the second satellite.

15. The computer-readable medium as in claim 14, wherein the process further comprises:
determining the angular diversity of the plurality of available satellites based on a difference in an angle between a line of sight between the communication device for the plurality of available satellites.

16. The computer-readable medium as in claim 15, wherein the first satellite and second satellite are sufficiently diverse when the angle between the line of sight towards the first and second satellites is greater than an angle of a lobe of a satellite antenna of the communication device.

17. The computer-readable medium as in claim 14, wherein the message segmentation policy defines one or more of: a number of segments to which the particular message should be segmented; a size of each segment; a segmentation configuration; a number of satellites that should be used for the particular message; and an association between segments and specific satellites that should be used for each segment.

18. The computer-readable medium as in claim 14, wherein the process further comprises:

preventing communicating of the particular message in response to there being no set of satellites of the plurality of available satellites with a sufficient degree of diversity.

19. The computer-readable medium as in claim 14, wherein the process further comprises:

placing the one or more first message segments in a first transceiver queue of the communication device;

placing the one or more second message segments in a second transceiver queue of the communication device;

communicating the one or more first segments from the first transceiver queue when a satellite antenna of the communication device is pointing at the first satellite; and communicating the one or more second segments from the second transceiver queue when the satellite antenna of the communication device is pointing at the second satellite.

20. An apparatus, comprising:

a processor configured to execute one or more processes;

a communication interface configured to communicate via one or more satellite antennas associated with the apparatus; and a memory configured to store a process executable by the processor, the process, when executed, configured to:

determine a plurality of available satellites for communication from the apparatus;

determine angular degrees of diversity among the plurality of available satellites;

select at least a first satellite and second satellite of the plurality of available satellites based on the degrees of angular diversity such that the first satellite and second satellite are sufficiently angularly diverse;

determine a message segmentation policy for a particular message;

segment the particular message into one or more first segments and one or more second segments based on the segmentation policy; and communicate the one or more first segments of the particular message to the first satellite and the one or more second segments of the particular message to the second satellite.

* * * * *